United States Patent
Schoenherr et al.

(10) Patent No.: US 10,005,459 B2
(45) Date of Patent: Jun. 26, 2018

(54) METHOD AND APPARATUS FOR OPERATING A VEHICLE

(71) Applicant: Robert Bosch GmbH, Stuttgart (DE)

(72) Inventors: Michael Schoenherr, Renningen-Malmsheim (DE); Stefan Nordbruch, Kornwestheim (DE); Stefan Hoffmann, Bietigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/149,699

(22) Filed: May 9, 2016

(65) Prior Publication Data

US 2016/0332621 A1 Nov. 17, 2016

(30) Foreign Application Priority Data

May 13, 2015 (DE) ........................ 10 2015 208 913

(51) Int. Cl.
  *G05D 1/00* (2006.01)
  *B60W 30/06* (2006.01)
  *B62D 15/02* (2006.01)

(52) U.S. Cl.
  CPC ......... *B60W 30/06* (2013.01); *B62D 15/0285* (2013.01); *B60W 2550/10* (2013.01); *B60W 2550/308* (2013.01); *B60W 2550/40* (2013.01); *B60W 2550/408* (2013.01)

(58) Field of Classification Search
  USPC .......................................................... 701/23
  See application file for complete search history.

(56) References Cited

U.S. PATENT DOCUMENTS

| | | | |
|---|---|---|---|
| 2003/0028322 A1* | 2/2003 | Ogawa | G01C 21/3484 701/469 |
| 2011/0022269 A1* | 1/2011 | Nakazono | G08G 1/14 701/41 |
| 2012/0112929 A1* | 5/2012 | Gupta | G08G 1/146 340/932.2 |
| 2013/0231824 A1* | 9/2013 | Wilson | G05D 1/0246 701/26 |
| 2014/0350804 A1* | 11/2014 | Park | B62D 15/0285 701/51 |
| 2016/0243955 A1* | 8/2016 | Yoshida | B62D 15/028 |
| 2016/0284217 A1* | 9/2016 | Lee | G08G 1/143 |

FOREIGN PATENT DOCUMENTS

DE  102012222562  6/2014

* cited by examiner

*Primary Examiner* — Tyler Paige
(74) *Attorney, Agent, or Firm* — Norton Rose Fulbright US LLP; Gerard Messina

(57) ABSTRACT

A method for operating a vehicle, comprising receiving one or more dimensions of a parking position via a communication network, and autonomously maneuvering the vehicle into the parking position based on the one or more dimensions. An apparatus for operating a vehicle, and a method and an apparatus for assisting a vehicle upon maneuvering into a parking position are also described. A vehicle, a parking system for vehicles, and a computer program are also described.

26 Claims, 3 Drawing Sheets

METHOD AND APPARATUS FOR OPERATING A VEHICLE

CROSS REFERENCE

The present application claims the benefit under 35 U.S.C. 119 of German Patent Application No. DE 102015208913.4 filed on May 13, 2015, which is expressly incorporated herein by reference in its entirety.

FIELD

The present invention relates to a method and an apparatus for operating a vehicle. The present invention further relates to a method and an apparatus for assisting a vehicle upon maneuvering into a parking position. The present invention furthermore relates to a vehicle, to a parking system for vehicles, and to a computer program.

BACKGROUND INFORMATION

German Published Application DE 10 2012 222 562 A1 describes a system for managed parking lots, for transferring a vehicle from a starting position into a target position.

In a fully automatic (autonomous) valet parking system, a vehicle is parked by its driver at a delivery site, for example in front of a multi-story parking lot, and from there the vehicle drives itself into a parking position or parking bay and back to the delivery site again.

Conventional parking assistance systems of a vehicle generally measure a parking space before parking. In other words, the vehicle drives past the parking space before parking, in order to measure the parking space. After measurement, the vehicle drives back again. This type of measurement can have the disadvantage, for example, that traffic following that vehicle can possibly be impeded, for example because it must back up again in order to make room for the vehicle.

SUMMARY

An object of the present invention is to enable efficient autonomous maneuvering of a vehicle into a parking position.

According to one aspect of the present invention, an example method for operating a vehicle is provided, encompassing the following steps:
  receiving one or more dimensions of a parking position via a communication network;
  autonomously maneuvering the vehicle into the parking position based on the one or more dimensions.

According to another aspect of the present invention, an example apparatus for operating a vehicle is provided, encompassing:
  a communication interface for receiving one or more dimensions of a parking position via a communication network; and
  a control device for autonomously maneuvering the vehicle into the parking position based on the one or more dimensions.

According to a further aspect of the present invention, an example method for assisting a vehicle upon maneuvering into a parking position is provided, encompassing the following step:
  transmitting one or more dimensions of a parking position via a communication network to the vehicle so that the vehicle can autonomously maneuver into the parking position based on the one or more dimensions.

According to another aspect of the present invention, an example apparatus for assisting a vehicle upon maneuvering into a parking position is provided, encompassing:
  a communication interface for transmitting one or more dimensions of a parking position via a communication network to the vehicle so that the vehicle can autonomously maneuver into the parking position based on the one or more dimensions.

According to yet another aspect of the present invention, an example vehicle that encompasses the apparatus for operating a vehicle is provided.

According to yet another aspect of the present invention, an example parking system for vehicles is provided, the parking system encompassing several parking positions in which vehicles can park, the parking system further encompassing the apparatus for assisting a vehicle upon maneuvering into a parking position.

According to a further aspect of the present invention, an example computer program is provided, which program encompasses program code for carrying out the method for operating a vehicle, and/or for carrying out the method for assisting a vehicle upon maneuvering into a parking position, when the computer program is executed on a computer.

The present invention thus encompasses, in particular and inter alia, the idea of making one or more dimensions of the parking position available via a communication network to the vehicle for autonomous parking. The result is to provide, in particular, the technical advantage that the vehicle itself no longer needs to measure the parking position. The further result is to provide the technical advantage that traffic following that vehicle is no longer impeded. In particular, the vehicle can maneuver autonomously into the parking position more quickly as compared with the situation in which the vehicle must first itself measure the parking position before autonomous parking.

A "parking position" for purposes of the present invention is a position at which the vehicle is intended to park autonomously.

"Dimensions" for purposes of the present invention encompass in particular a length and/or a width and/or a height of the parking position. "Height" means here, for example, a distance from a floor of the parking position to a ceiling that may be present or to an object, hanging from a ceiling that may be provided, that might collide with a vehicle that is too tall.

According to an embodiment, the parking position is demarcated by way of (for example, dashed) demarcation lines. "Dimensions" therefore encompass, for example, a length of those lines and/or a distance between two oppositely located demarcation lines.

According to an embodiment, the parking position is demarcated by way of one or more walls and/or by way of one or more open areas. "Dimensions" therefore encompass, for example, a distance between two oppositely located walls and/or between two oppositely located open areas and/or between a wall and an open area located opposite the wall. The parking position is thus, for example, respectively disposed between the oppositely located walls or between two oppositely located open areas or between a wall and an open area located opposite the wall.

"Dimensions" encompass in particular a distance between a wall demarcating the parking position and a further vehicle placed immediately adjacent to the parking position. The parking position is thus located, for example, between the wall and the further vehicle.

"Dimensions" encompass, in particular, a distance between an open area demarcating the parking position and a further vehicle placed immediately adjacent to the parking position. The parking position is thus located, for example, between the open area and the further vehicle.

"Dimensions" for purposes of the present invention encompass in particular an angle between a longitudinal axis of the parking position and a longitudinal axis of a roadway that passes directly by the parking position. The longitudinal axis proceeds in the direction of the greatest extension respectively of the parking position and of the roadway. The longitudinal axis of the roadway corresponds as a rule to a predefined travel direction. An "angle" can be equal, for example, to 45°. This means that the concept according to the present invention can be utilized even if a parking position proceeds not only transversely or longitudinally with respect to the roadway. Thanks to consideration of the angle, efficient parking can advantageously be effected.

According to an embodiment, provision is made that the one or more dimensions are encompassed by a digital map of a parking area encompassing the parking position, which is received via the communication network. The result is to provide, in particular, the technical advantage that in addition to the dimension, a digital map of the parking area is also made available to the vehicle so that, for example, the vehicle can drive autonomously in the parking area based on the digital map.

The digital map can encompass, for example, a current or instantaneous position of the vehicle with reference to the digital map. This therefore means that the vehicle is localized on the digital map. Efficient navigation of the vehicle in the parking area can thereby be achieved.

According to a further embodiment, provision is made that a vehicle distance of a further vehicle, placed immediately adjacent to the parking position, with respect to the parking position is received via the communication network, the vehicle being autonomously maneuvered into the parking position based on the vehicle distance. The result is to provide, in particular, the technical advantage that a collision risk of a collision between the vehicle and the further vehicle can be decreased, since because the vehicle distance is made available, the vehicle can take that vehicle distance into account as it maneuvers into the parking position.

In another embodiment, provision is made that a spacing between two further vehicles, respectively placed immediately adjacent to the parking position, is received via the communication network, the vehicle being maneuvered autonomously into the parking position based on the spacing. The result is to provide, in particular, the technical advantage that a collision risk of a collision between the vehicle and the two vehicles placed immediately adjacent to the parking position can be reduced, since the vehicle now knows how large the distance is between those two vehicles. The vehicle can thus correspondingly adapt its autonomous parking. For example, it may happen that these further vehicles are placed partly in the parking position into which the vehicle wishes to maneuver. This therefore means that the parking position width actually available can be less than the width predefined by demarcation lines. According to the present embodiment this can be taken into account in the context of autonomous parking.

Embodiments with regard to the method for operating a vehicle ensue analogously from embodiments with regard to the apparatus for operating a vehicle, and vice versa. This therefore means that technical functionalities relating to the apparatus for operating a vehicle ensue analogously from corresponding technical functionalities of the method for operating a vehicle, and vice versa. Statements made correspondingly in connection with the method apply to the apparatus, and vice versa.

According to an embodiment, provision is made that the communication interface is embodied to receive via the communication network a digital map of a parking area encompassing the parking position, the digital map encompassing the one or more dimensions.

The digital map can encompass, for example, a current or instantaneous position of the vehicle with reference to the digital map. This therefore means that the vehicle is localized in the digital map. Efficient navigation of the vehicle in the parking area can thereby be achieved.

In another embodiment, provision is made that the communication interface is embodied to receive via the communication network a vehicle distance of a further vehicle, placed immediately adjacent to the parking position, with respect to the parking position, the control device being embodied to maneuver the vehicle autonomously into the parking position based on the vehicle distance.

According to yet another embodiment, provision is made that the communication interface is embodied to receive via the communication network a spacing between two further vehicles respectively placed immediately adjacent to the parking position, the control device being embodied to maneuver the vehicle autonomously into the parking position based on the spacing.

According to an embodiment, provision is made that the one or more dimensions are encompassed by a digital map of a parking area encompassing the parking position, which is transmitted via the communication network to the vehicle. The technical result ensuing therefrom ensues analogously from the embodiment in which the digital map is received via the communication network.

In another embodiment, provision is made that a vehicle distance of a further vehicle, placed immediately adjacent to the parking position, with respect to the parking position is measured, the measured vehicle distance being transmitted via the communication network to the vehicle so that the vehicle can autonomously maneuver into the parking position based on the vehicle distance. The technical advantage ensuing therefrom ensues analogously from the embodiment in which the vehicle distance is received via the communication network.

In another embodiment, provision is made that a spacing between two further vehicles, respectively placed immediately adjacent to the parking position, is measured, the measured spacing being transmitted via the communication network to the vehicle so that the vehicle can maneuver autonomously into the parking position based on the spacing. The technical advantage ensuing therefrom ensues analogously from the embodiment in which the spacing is received via the communication network.

In an embodiment, provision is made that a respective distance between two oppositely located walls and/or between two oppositely located open areas and/or between a wall and an open area located opposite the wall is measured. According to an embodiment the respective measured distance is transmitted via the communication network to the vehicle.

Embodiments relating to the apparatus for assisting a vehicle upon maneuvering into a parking position ensue analogously from embodiments relating to the method for assisting a vehicle upon maneuvering into a parking position, and vice versa. This therefore means that technical functionalities relating to the method for assisting a vehicle upon maneuvering into a parking position ensue from corresponding technical functionalities relating to the apparatus for assisting a vehicle upon maneuvering into a parking position, and vice versa. Embodiments made in connection with the method apply analogously to the apparatus, and vice versa.

According to an embodiment, provision is made that the communication interface is embodied to transmit via the communication network to the vehicle a digital map of a parking area encompassing the parking position, which encompasses the one or more dimensions.

In another embodiment, provision is made that a measurement device is provided for measuring a vehicle distance of a further vehicle, placed immediately adjacent to the parking position, with respect to the parking position, the communication interface being embodied to transmit the measured vehicle distance via the communication network to the vehicle so that the vehicle can maneuver autonomously into the parking position based on the vehicle distance.

In another embodiment, provision is made that a measurement device is provided for measuring a spacing between two further vehicles respectively placed immediately adjacent to the parking position, the communication interface being embodied to transmit the measured spacing via the communication network to the vehicle so that the vehicle can maneuver autonomously into the parking position based on the spacing.

In an embodiment, provision is made that a measurement device is provided for measuring a respective distance between two oppositely located walls and/or between two oppositely located open areas and/or between a wall and an open area opposite the wall.

According to an embodiment, the communication interface is embodied to receive via the communication network a respective distance between two oppositely located walls and/or between two oppositely located open areas and/or between a wall and an open area located opposite the wall.

According to an embodiment, the communication interface is embodied to transmit to the vehicle, via the communication network, a respective distance between two oppositely located walls and/or between two oppositely located open areas and/or between a wall and an open area located opposite the wall.

According to an embodiment, the measurement device encompasses a video camera and/or a laser sensor and/or an ultrasonic sensor and/or a LiDAR sensor and/or a radar sensor. According to an embodiment, provision is made that the vehicle is configured or embodied to execute or carry out the method for operating a vehicle.

In a further embodiment, provision is made that the parking system for vehicle is configured or embodied to execute or carry out the method for assisting a vehicle upon maneuvering into a parking position.

According to an embodiment, the communication network encompasses a WLAN network and/or a mobile radio network.

In an embodiment, a respective communication via the communication network is encrypted.

A "parking area" for purposes of the present invention can also be referred to as a "parking surface" and serves as a placement surface for vehicles. The parking area thus constitutes in particular a continuous surface that has several parking locations (in the context of a parking area on private property) or parking spaces (in the context of a parking area on public property). In an embodiment, the parking area can be encompassed by a multi-story parking lot. In particular, the parking area is encompassed by a garage.

"Autonomously" means in particular, for purposes of the invention, that the vehicle maneuvers into the parking position automatically, i.e., with no intervention by a driver. The vehicle thus maneuvers automatically, i.e., in self-driving fashion, into the parking position, with no need for a driver to control the vehicle for that purpose.

The control device is thus embodied in particular to control a transverse and/or longitudinal guidance system of the vehicle.

The present invention is explained in further detail below with reference to preferred exemplifying embodiments.

BRIEF DESCRIPTION OF THE DRAWINGS

Identical reference characters are used hereinafter for identical features.

DETAILED DESCRIPTION OF EXAMPLE EMBODIMENTS

Figure 1:
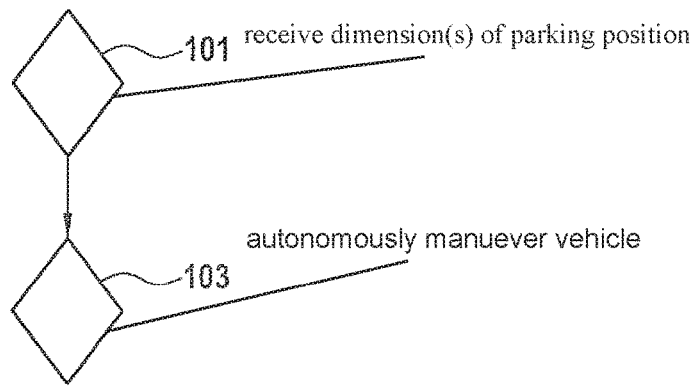
FIG. 1 is a flow chart of a method for operating a vehicle.
Figure 2:
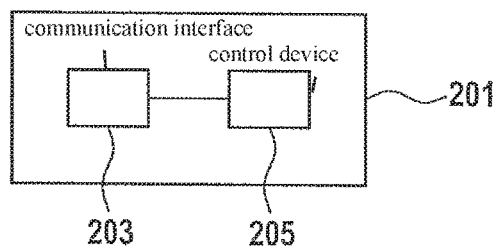
FIG. 2 shows an apparatus for operating a vehicle.
Figure 3:
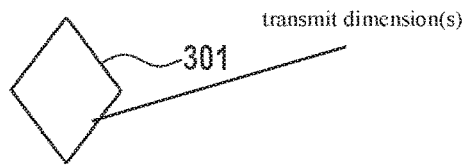
FIG. 3 is a flow chart of a method for assisting a vehicle upon maneuvering into a parking position.
Figure 4:
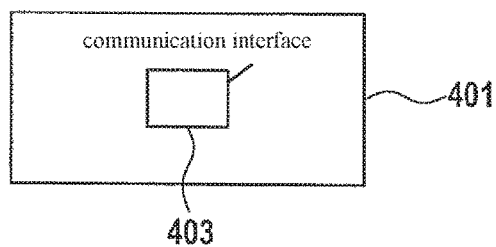
FIG. 4 shows an apparatus for assisting a vehicle upon maneuvering into a parking position.
Figure 5:
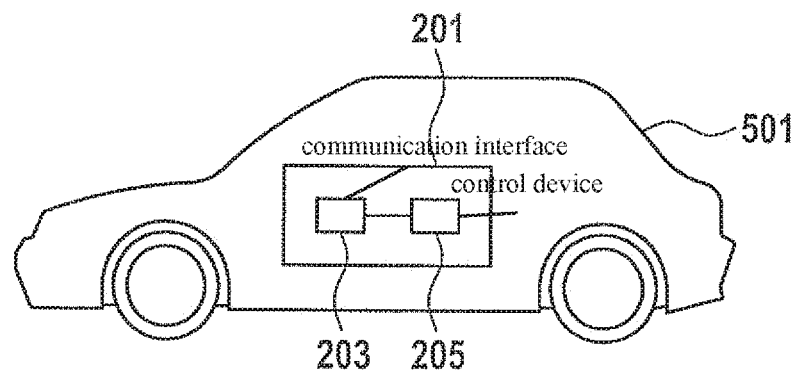
FIG. 5 shows a vehicle.
Figure 6:
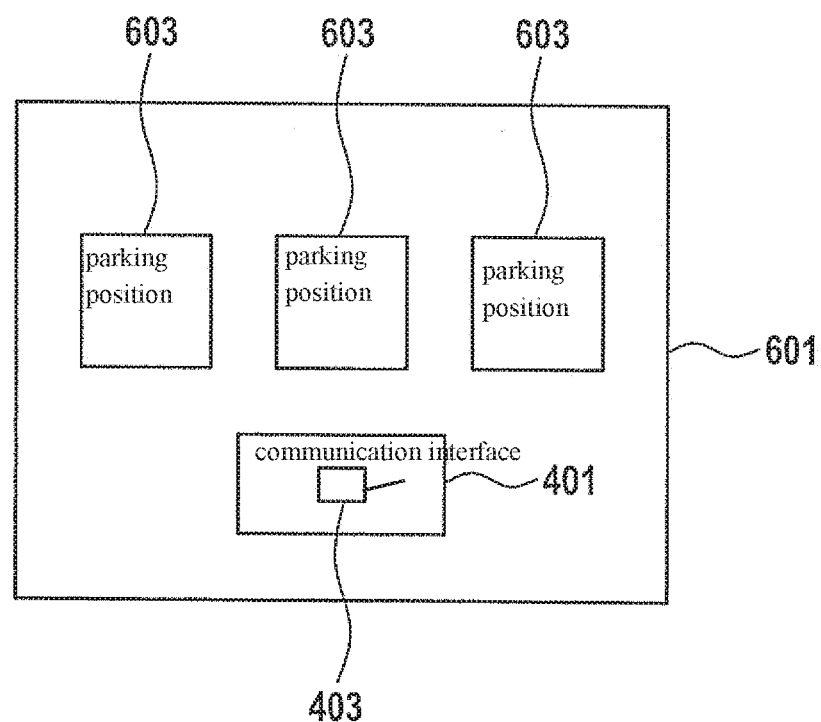
FIG. 6 shows a parking system for vehicles.

FIG. 1 is a flow chart of a method for operating a vehicle.
The method encompasses the following steps:
receiving 101 one or more dimensions of a parking position via a communication network;
autonomously maneuvering 103 the vehicle into the parking position based on the one or more dimensions.
FIG. 2 shows an apparatus 201 for operating a vehicle.
Apparatus 201 encompasses:
a communication interface 203 for receiving one or more dimensions of a parking position via a communication network; and
a control device 205 for autonomously maneuvering the vehicle into the parking position based on the one or more dimensions.
FIG. 3 is a flow chart of a method for assisting a vehicle upon maneuvering into a parking position.
The method encompasses the following step:
transmitting 301 one or more dimensions of a parking position via a communication network to the vehicle so that the vehicle can autonomously maneuver into the parking position based on the one or more dimensions.
FIG. 4 shows an apparatus 401 for assisting a vehicle upon maneuvering into a parking position.
Apparatus 401 encompasses:
a communication interface 403 for transmitting one or more dimensions of a parking position via a communication network to the vehicle so that the vehicle can maneuver autonomously into the parking position based on the one or more dimensions.
FIG. 5 shows a vehicle 501 that encompasses apparatus 201 of FIG. 2.
FIG. 6 shows a parking system 601 for vehicles.
Parking system 601 encompasses several parking positions 603 in which vehicles can park. Parking system 601 furthermore encompasses apparatus 401 of FIG. 4. By way of example, three parking positions 603 are shown. In embodiments that are not shown, more or fewer than three parking positions 603 are shown. Parking positions 603 are encompassed, for example, by a parking area.

Figure 7:
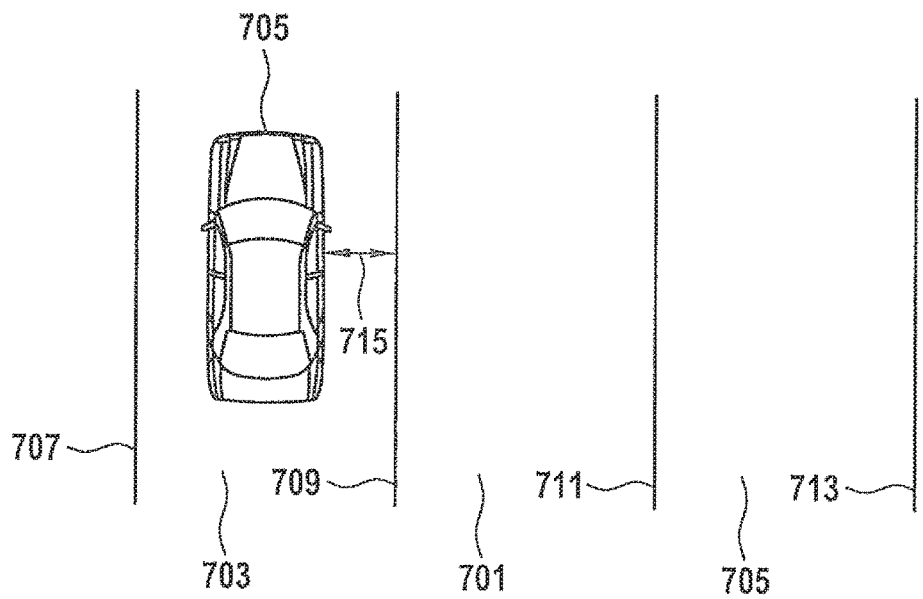
FIG. 7 shows a further vehicle that is placed immediately adjacent to a parking position.

FIG. 7 shows three parking positions 701, 703, 705. Parking positions 701, 703, 705 are separated from one another by demarcation lines 707, 709, 711, 713. Parking position 701 is located centeredly between the two parking positions 703 and 705.

A vehicle (not shown) wishes to maneuver into parking position 701. A further vehicle 705 is placed in parking position 703 to the left of parking position 701. A vehicle distance of further vehicle 705 with respect to demarcation line 709 between the two parking positions 701 and 703 is characterized by a double arrow having the reference character 715. According to an embodiment provision is made that this vehicle distance 715 is measured and is transmitted via the communication network to the vehicle wishing to park, so that the vehicle can maneuver autonomously into parking position 701 on the basis of that measured vehicle distance 715.

Figure 8:
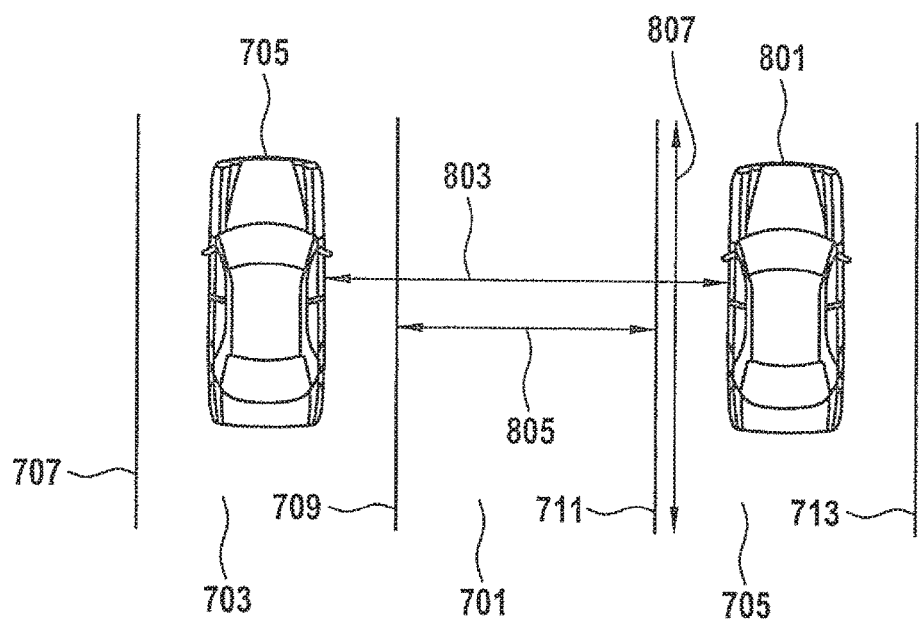
FIG. 8 shows two vehicles placed immediately adjacent to a parking position.

FIG. 8 shows, analogously to FIG. 7, the three parking positions 701, 703, 705. A vehicle (not shown) wishes to park autonomously. A further vehicle 705, 801 is placed respectively in both parking positions 703 and 705. These two vehicles 705, 801 are thus placed immediately adjacent to parking position 701.

A spacing between these two vehicles 705, 801 is characterized by a double arrow having the reference character 803.

According to an embodiment provision is made that this spacing 803 is measured and is transmitted via the communication network to the vehicle. The vehicle can then maneuver autonomously into parking position 701 based on that spacing 803.

A width of parking position 701 is characterized, by way of example, by a double arrow having the reference character 805. A length of parking position 701 is characterized, by way of example, by a double arrow having the reference character 807.

According to an embodiment the width 805 and length 807 are made available via the communication network to the vehicle. The vehicle itself thus no longer needs to measure parking position 701, but instead can maneuver autonomously into parking position 701 based on the dimensions made available, i.e. the length 807 and width 805.

In summary, the present invention furnishes an efficient and technical concept with which measurement in the context of an autonomous parking operation can be avoided.

According to an embodiment autonomous parking is part of an autonomous valet parking operation ("automatic valet parking," AVP). In an autonomous or automatic valet parking system of this kind, the vehicle is parked or placed by its driver at a delivery site or delivery position, for example in front of the parking area, in particular in front of a multi-story parking lot. From this delivery position the vehicle drives autonomously, i.e., in self-driving fashion, or under remote control, to a parking position, for example to a parking bay.

Having arrived there, the vehicle maneuvers autonomously, i.e., in particular in self-driving fashion, into the parking position, for example into the parking bay. This occurs based on the dimensions of the parking position, in particular of the parking bay, which are made available via the communication network to the vehicle prior to its arrival at the parking position.

According to an embodiment provision is made that the one or more dimensions are transmitted via the communication network to the vehicle prior to its arrival at the parking position.

According to an embodiment provision is made that the one or more dimensions are received via the communication network prior to an arrival of the vehicle at the parking position.

In accordance with the present invention, dimensions of the parking position, i.e., for example of the parking space, are transferred to the vehicle in particular in advance, i.e., before the vehicle is at the parking space. For example, the dimensions are transferred by way of the apparatus.

According to an embodiment the apparatus is encompassed by a parking area management system that can be, for example, a multi-story parking lot management system.

The vehicle can thus advantageously park autonomously without a previous measurement pass.

In an embodiment, the dimensions are so-called "stationary" data; this therefore means that they are encompassed, for example, by a digital map of the parking area.

In a further embodiment data updated in real time (also called "dynamic" data) are additionally made available via the communication network to the vehicle. Dynamic data of this kind encompass, for example, a spacing and/or a vehicle distance that has previously been measured.

According to an embodiment the measurement device can be encompassed, for example, by a monitoring system of the parking area. A monitoring system of this kind can also be referred to as a "parking area monitoring system." According to an embodiment the monitoring system encompasses one or more video cameras and/or one or more radar sensors and/or one or more ultrasonic sensors and/or one or more LiDAR sensors and/or one or more laser sensors and/or one or more photoelectric barriers and/or one or more door opening sensors.

This therefore means that, for example, the monitoring system measures parking spaces, i.e., for example a distance between two vehicles that are placed immediately adjacent to the parking position into which the vehicle wishes to maneuver autonomously.

What is claimed is:

1. A method for operating a vehicle, comprising:
receiving, via a wireless communication network using a communication interface of the vehicle, at least one dimension of a parking position within a monitored parking area, the wireless communication network including at least one of a WLAN network and a mobile radio network, the at least one dimension of the parking position being received from a parking area management system of the parking area, the parking area management system including a monitoring system that monitors the parking area, the parking area having a plurality of parking spaces, the plurality of parking spaces including the parking position, the at least one dimension being measured by the monitoring system; and
autonomously maneuvering the vehicle, using a control device of the vehicle, into the parking position based on the received at least one dimension.

2. The method as recited in claim 1, wherein the received at least one dimension includes a digital map of the parking area encompassing the parking position, which is received by the vehicle from the parking area management system via the wireless communication network.

3. The method as recited in claim 1, further comprising:
receiving, from the parking management system via the wireless communication network using the communication interface of the vehicle, a vehicle distance of a further vehicle, placed immediately adjacent to the parking position, with respect to the parking position, the vehicle being autonomously maneuvered into the parking position based on the received vehicle distance.

4. The method as recited in claim 1, further comprising:
receiving, from the parking management system via the wireless communication network using the communication interface of the vehicle, a spacing between two further vehicles respectively placed immediately adjacent to the parking position, the vehicle being maneuvered autonomously into the parking position based on the received spacing.

5. The method as recited in claim 1, wherein the received at least one dimension includes at least one of: i) a distance between two oppositely located walls, ii) a distance between two oppositely located open areas, iii) a distance between a wall and an open area located opposite the wall, iv) a distance between a wall demarcating the parking position and a further vehicle placed immediately adjacent to the parking position, and v) a distance between an open area demarcating the parking position and a further vehicle placed immediately adjacent to the parking position.

6. An apparatus for operating a vehicle, comprising:
a communication interface to receive via a wireless communication network from a parking area management system of a monitored parking area, at least one dimension of a parking position within the monitored parking area, the parking area management system including a monitoring system that monitors the parking area, the parking area having a plurality of parking spaces, the plurality of parking spaces including the parking position, the at least one dimension being measured by the monitoring system, the wireless communication network including at least one of a WLAN network and a mobile radio network; and
a control device to autonomously maneuver the vehicle into the parking position based on the received at least one dimension.

7. The apparatus as recited in claim 6, wherein the communication interface is embodied to receive from the parking area management system via the wireless communication network a digital map of a parking area encompassing the parking position, the digital map encompassing the at least one dimension.

8. The apparatus as recited in claim 6, wherein the communication interface is embodied to receive from the parking area management system via the wireless communication network a vehicle distance of a further vehicle, placed immediately adjacent to the parking position, with respect to the parking position, and the control device is embodied to maneuver the vehicle autonomously into the parking position based on the received vehicle distance.

9. The apparatus as recited in claim 6, wherein the communication interface is embodied to receive from the parking area management system via the wireless communication network a spacing between two further vehicles respectively placed immediately adjacent to the parking position, and the control device is embodied to maneuver the vehicle autonomously into the parking position based on the received spacing.

10. The apparatus as recited in claim 6, wherein the at least one dimension encompasses at least one of: i) a distance between two oppositely located walls, ii) a distance between two oppositely located open areas, iii) a distance between a wall and an open area located opposite the wall, iv) a distance between a wall demarcating the parking position and a further vehicle placed immediately adjacent to the parking position, and v) a distance between an open area demarcating the parking position and a further vehicle placed immediately adjacent to the parking position.

11. A method for assisting a vehicle to autonomously maneuver into a parking position, comprising:
monitoring a parking area by a parking area management system of the parking area, the parking area management system including a monitoring system for monitoring the parking area, the parking area having a plurality of parking spaces;
measuring, by the monitoring system of the parking area management system, at least one dimension of a parking position within the monitored parking area, the monitoring system measuring the at least one dimension with a measurement device of the monitoring system, the measurement device including at least one of a video camera, a laser sensor, an ultrasonic sensor, a LIDAR sensor, and a radar sensor;
after the measuring, transmitting, by the parking area management system using a communication interface, the measured at least one dimension of the parking position via a wireless communication network to the vehicle so that the vehicle can autonomously maneuver into the parking position based on the transmitted measured at least one dimension, the wireless communication network including at least one of a WLAN network and a mobile radio network.

12. The method as recited in claim 11, wherein the measured at least one dimension is encompassed by a digital map of the parking area encompassing the parking position, which is transmitted by the parking area management system via the wireless communication network to the vehicle.

13. The method as recited in claim 12, wherein the digital map encompasses a current position of the vehicle with reference to the parking area.

14. The method as recited in claim 11, further comprising:
measuring with the measurement device, by the monitoring system of the parking area management system, a vehicle distance of a further vehicle, placed immediately adjacent to the parking position, with respect to the parking position, the measured distance being transmitted via the wireless communication network to the vehicle so that the vehicle can autonomously maneuver into the parking position based on the transmitted measured distance.

15. The method as recited in claim 11, further comprising:
measuring with the measurement device, by the monitoring system of the parking area management system, a spacing between two further vehicles, respectively placed immediately adjacent to the parking position, the measured spacing being transmitted via the wireless communication network by the parking area management system to the vehicle so that the vehicle can maneuver autonomously into the parking position based on the transmitted measured spacing.

16. The method as recited in claim 11, wherein the measured at least one dimension encompasses at least one of: i) a distance between two oppositely located walls, ii) a distance between two oppositely located open areas, iii) a distance between a wall and an open area located opposite the wall, iv) a distance between a wall demarcating the parking position and a further vehicle placed immediately adjacent to the parking position, and v) a distance between an open area demarcating the parking position and a further vehicle placed immediately adjacent to the parking position.

17. The method as recited in claim 11, wherein the monitoring system measures the at least one dimension with a measurement device of the monitoring system, the measurement device including at least one of a video camera, a laser sensor, an ultrasonic sensor, a LIDAR sensor, and a radar sensor, and transmits the at least one dimension to the vehicle, the vehicle autonomously maneuvering, using the control device of the vehicle, into the parking position based on the transmitted at least one dimension.

18. An parking area management system of a parking area for assisting vehicles to autonomously maneuver into a parking position within the parking area, comprising:
a parking area monitoring system of the parking area to monitor the parking area, the parking area having a plurality of parking spaces, the parking area monitoring system configured to measure the at least one dimension with a measurement device of the monitoring system, the measurement device including at least one of a video camera, a laser sensor, an ultrasonic sensor, a LIDAR sensor, and a radar sensor, at least one dimension of a parking position within the monitored parking area; and
a communication interface to transmit, via a wireless communications network, the measured at least one dimension of a parking position within the monitored parking area to one of the vehicles so that the vehicle can autonomously maneuver into the parking position based on the transmitted at least one dimension, the wireless communication network including at least one of a WLAN network and a mobile radio network.

19. The parking area management system as recited in claim 18, wherein the communication interface is embodied to transmit via the wireless communication network to the vehicle a digital map of a parking area encompassing the parking position, which encompasses the at least one dimension.

20. The parking area management system as recited in claim 19, wherein the digital map encompasses a current position of the vehicle with reference to the parking area.

21. The parking area management system as recited in claim 18, wherein the parking area monitoring system is configured to measure, with the measurement device, a vehicle distance of a further vehicle, placed immediately adjacent to the parking position, with respect to the parking position, wherein the communication interface is embodied to transmit the measured vehicle distance via the wireless communication network to the vehicle so that the vehicle can maneuver autonomously into the parking position based on the transmitted measured vehicle distance.

22. The parking area management system as recited in claim 18, wherein the parking area monitoring system is configured to measure, with the measurement device, a spacing between two further vehicles respectively placed immediately adjacent to the parking position, wherein the communication interface is embodied to transmit the measured spacing via the wireless communication network to the vehicle so that the vehicle can maneuver autonomously into the parking position based on the transmitted measured spacing.

23. The parking area management system as recited in claim 18, wherein the at least one dimension encompasses at least one of: i) a distance between two oppositely located walls, ii) a distance between two oppositely located open areas, iii) a distance between a wall and an open area located opposite the wall, v) a distance between a wall demarcating the parking position and a further vehicle placed immediately adjacent to the parking position, and vi) a distance between an open area demarcating the parking position and a further vehicle placed immediately adjacent to the parking position.

24. A vehicle, comprising:
an apparatus for operating a vehicle, including a communication interface to receive from a parking area management system of a monitored parking area via a wireless communication network at least one dimension of a parking position within the parking area, the parking area management system including a parking area monitoring system that monitors the parking area, the parking area having a plurality of parking spaces, the plurality of parking spaces including the parking position, the received at least one dimension of the parking position being measured by the parking area monitoring system, and a control device to autonomously maneuver the vehicle into the parking position based on the received at least one dimension, the wireless communication network including at least one of a WLAN network and a mobile radio network.

25. A parking system for vehicles encompassing several parking positions in which vehicles can park, and comprising:
an apparatus for assisting a vehicle autonomously maneuver into a parking position within a monitored parking area, the apparatus including a parking area monitoring system of the parking area to monitor the parking area, the parking area having a plurality of parking spaces, the parking area monitoring system measuring at least one dimension of a parking position within the monitored parking area, the parking area monitoring system configured to measure the at least one dimension with a measurement device of the monitoring system, the measurement device including at least one of a video camera, a laser sensor, an ultrasonic sensor, a LIDAR sensor, and a radar sensor, and a communication interface to transmit, via a wireless communications network, the measured at least one dimension of a parking position to the vehicle so that the vehicle can autonomously maneuver into the parking position based on the transmitted at least one dimension, the wireless communication network including at least one of a WLAN network and a mobile radio network.

26. A non-transitory computer-readable storage medium storing program code for operating a vehicle, the program code, when executed by a computer, causing the computer to perform:
receiving, via a wireless communication network using a communication interface of the vehicle, at least one dimension of a parking position within a monitored parking area, the wireless communication network including at least one of a WLAN network and a mobile radio network, the at least one dimension of the parking position being received from a parking area management system of the parking area, the parking area management system including a monitoring system that monitors the parking area, the parking area having a plurality of parking spaces, the plurality of parking spaces including the parking position, the parking area monitoring system measuring the at least one dimension of a parking position within the monitored parking area; and autonomously maneuvering the vehicle, using a control device of the vehicle, into the parking position based on the received at least one dimension.

\* \* \* \* \*